United States Patent [19]

Nishio et al.

[11] Patent Number: 4,674,528
[45] Date of Patent: Jun. 23, 1987

[54] BUTTERFLY VALVE

[75] Inventors: Hideaki Nishio, Chino; Masahiko Tomono, Suwa, both of Japan

[73] Assignee: Kitz Corporation, Tokyo, Japan

[21] Appl. No.: 849,264

[22] Filed: Apr. 7, 1986

[30] Foreign Application Priority Data

Sep. 11, 1985 [JP] Japan ............................ 60-138153[U]

[51] Int. Cl.$^4$ ............................................. F16L 7/00
[52] U.S. Cl. ................... 137/375; 251/292; 251/306; 251/308
[58] Field of Search ............... 251/305, 308, 292, 306; 137/375

[56] References Cited

U.S. PATENT DOCUMENTS

| | | | |
|---|---|---|---|
| 2,081,307 | 5/1937 | Rosenberg | 251/308 |
| 3,306,316 | 2/1967 | Stillwagon | 251/308 |
| 3,572,632 | 3/1971 | Bengtsson | 251/306 |
| 3,902,697 | 9/1975 | Robinson | 251/306 |
| 3,904,173 | 9/1975 | Naylor | 251/308 |
| 4,492,361 | 1/1985 | Jacquet et al. | 251/306 |
| 4,509,720 | 4/1985 | Griffin et al. | 251/308 |
| 4,580,593 | 4/1986 | Herberholz | 251/308 |

FOREIGN PATENT DOCUMENTS 60-101267  7/1985  Japan .

Primary Examiner—Martin P. Schwadron
Assistant Examiner—Sheri M. Novack
Attorney, Agent, or Firm—Wenderoth, Lind & Ponack

[57] ABSTRACT

A butterfly valve includes a body having pipe connecting parts forming two opposite ends thereof and a cylindrical flow path interconnecting the pipe connecting parts, a stem attached rotatably at the central part of the body diametrically across the cylindrical flow path, a lever handle connected non-rotatably to the external leading end of the stem, and a disc formed by joining two substantially circular metallic plates in a mutually opposed manner, coating the entire outer surfaces of the metallic plates with a corrosionproof, resilient material, and boring a stem-insertion hole between the two joined metallic plates in the central diametric position thereof and disposed inside the cylindrical flow path of the body for accommodating the stem non-rotatably within the stem-insertion hole thereof. An externally open groove having a substantially U-shaped cross section is formed in the joint periphery of the two joined metallic plates of the disc. The externally open groove is filled tightly to capacity with a corrosionproof, resilient material. The corrosionproof, resilient material which tightly fills up the externally open groove confers a substantially semicircular cross-sectional outline to the periphery of the disc to engage with the cylindrical flow path of the body.

2 Claims, 23 Drawing Figures

BUTTERFLY VALVE

FIELD OF THE INVENTION AND RELATED ART STATEMENT

This invention relates to a butterfly valve used mainly for the regulation of a fluid in facilities for the manufacture of beverages and foodstuffs, pharmaceutical preparations, and chemical preparations, facilities for the conveyance of fuels such as oil and gas, facilities for the supply and distribution of water in agriculture, fisheries, and stock breeding industry, fire-fighting facilities in buildings, and facilities for the transfer of water and compressed air in plants, and more particularly to improvements in and concerning a butterfly valve having a relatively small diameter which suits any utility requiring a valve sparingly yielding to corrosion by a fluid being handled, inducing no internal stagnation of the fluid, and tolerating fine solid or coagulating particles entrained by the fluid.

Heretofore, gate valves and globe valves made of bronze have been preponderantly used in such facilities as enumerated above. The valves made of bronze, however, suffer at times from a disadvantage derived from the problem of corrosion caused by the fluid being handled. To avoid this disadvantage, valves made of stainless steel have found utility in some applications but they are expensive. As pipes made of resin and metallic pipes lined with resin have been disseminated, valves made of resin and metallic valves lined with resin have been filling a growing demand. In the case having valves of relatively small diameters, problems of strength and production have stood in the way toward development of suitable valves.

The gate valves and globe valves are difficult to operate because they cannot be opened or closed unless their handles are turned many times. Furthermore, since these valves have metallic seats, they have a disadvantage in that solid particles eat into the seats and consequently render perfect closure of the seats difficult and tend to inflict damage upon the seat surfaces. Furthermore, the gate valves by nature have reservoirs for liquids and, consequently, suffer from solid particles and flocs which stagnate in the reservoirs making perfect valve closure difficult and also suffer from such stagnating particles and flocs which can burst out in the fluid being handled and, because of their structural characteristics, fail to permit easy control of the flow volume of fluid. The globe valves offer heavy resistance to the fluid and display a poor degree of accurate valve opening.

In the circumstances, a great need has developed for butterfly valves and ball valves which can be opened and closed by a 90° rotation and can be operated with ease. Particularly, the demand is strong for butterfly valves which do not have reservoirs for liquids and are light in weight.

The conventional butterfly valves in general have a disc supported in place with a stem within the path for fluid at the center of the valve body. Even when the valves are fully opened, their discs close part of the paths for fluid and decrease the areas available for the flow of fluid. The extent to which the areas available for the flow of fluid are decreased by the discs is larger in valves having smaller valve diameters. In the case of butterfly valves using cast or forged discs, the smallest practical nominal diameter is about two inches. Thus, it has been held that any butterfly valve having a smaller nominal diameter is not practical. To meet the problem, butterfly valves using discs formed from metallic plates have been developed which are produced in small diameters without entailing any appreciable decrease in the area available for the flow of fluid. There are examples of these values disclosed by the specification of U.S. Pat. No. 3,902,697 and that of Japanese Utility Mode Public Disclosure No. SHO 60(1985)-101267. FIGS. 15 through 17 and FIGS. 18 through 23 of the accompanying drawings represent part of the drawings, respectively, in the specifications.

The construction disclosed in U.S. Pat. No. 3,902,697 and illustrated in FIGS. 15 through 17 of the accompanying drawings has the disadvantage that since metallic plates 35a, 35b which make up a disc 35 are not coated, they are susceptible to corrosion unless they are made of a corrosion proof material. A disc sheet 35c made of a resilient material is an annular member having a trapezoidal cross section. Although this disc sheet 35c is nipped between the peripheral portions of the two metallic plates 35a, 35b, it has the disadvantage that it produces torsion because it slides on the surface of the cylindrical body 35d, namely on a body seat, during the opening or closing motion of the valve. This phenomenon occurs more readily, particularly when a foreign object is caught fast in the seat. Furthermore in this construction, since the two metallic plates 35a, 35b are joined fast to a stem 34b by electric resistance welding (spot welding) while the metallic plates 35a, 35b, the disc seat 35c, and the stem 34b are held mutually tacked within the body 35d, the disc 35 can not be taken out by pulling the stem 34 after the component parts have been assembled. The butterfly valve of this construction, therefore, suffers from the disadvantage that the disc 35 or the disc seat 35c does not permit replacement.

In the construction disclosed in Japanese Utility Model Public Disclosure No. SHO 60(1985)-101267 and illustrated in FIGS. 18 through 23 of the accompanying drawings, it is a part 38 having a non-circular cross section (a square cross section in the illustrated embodiment) formed at one end part of a disc 36 that enables a stem 37 to be inserted non-rotatably in the disc 36 so as to transmit the rotation of the stem 37 to the disc 36 and cause a rotation of the disc 36. When the flow or pressure of the fluid, the friction occurring between a seat of the disc 36 and a body seat 40a, or the forced entry of a foreign object between the seats 36a and 40a tends to rotate the disc 36 or prevent the disc 36 from being rotated, the center of the force consequently exerted is directed along the center of the disc 36, which is separated from the aforementioned part 38 of a non-circular cross section. As a result, a torsional force develops and acts upon the disc 36 and possibly deforms the disc 36. The relative rotational forces of the stem 37 and the disc 36 jointly produce a force which tends to separate the two joined metallic plates 42 from each other. Moreover, this force acts concentrically on the aforementioned part 38 having a non-circular cross section exclusively. Of a multiplicity of rivets 39 serving to join the two metallic plates 42, substantially only the two opposed rivets 39 adjoining the part 38 of a non-circular cross section offer resistance to the force tending to separate the two metallic plates 42 from each other. This construction, therefore, has the disadvantage that the two rivets 39 upon which the force tending to cause the aforementioned separation concentrically acts are elongated until they possibly break, the two metallic plates 42 are separated from each other at the part 38 having a non-circular cross section, the condition of union between the stem 37 and the disc 36 is impaired, and the opening or closing motion of the valve is accomplished imperfectly.

Figure 18:
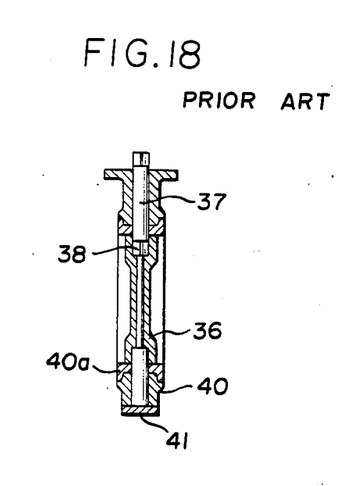
FIG. 18 is a sectional view illustrating another conventional butterfly valve.
Figure 19:
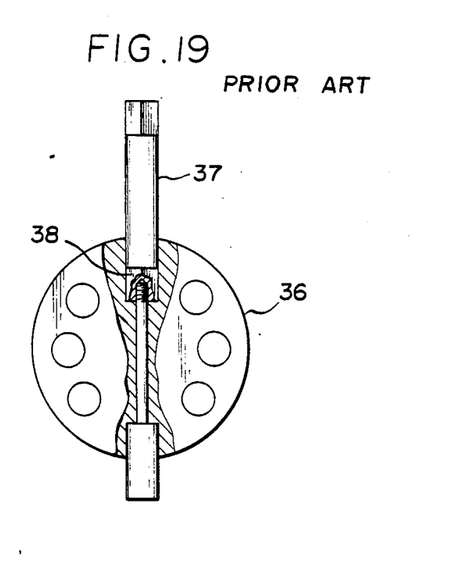
FIG. 19 is a cutaway partially magnified front view of the combination of the disc with the stem in the same conventional butterfly valve.
Figure 20:
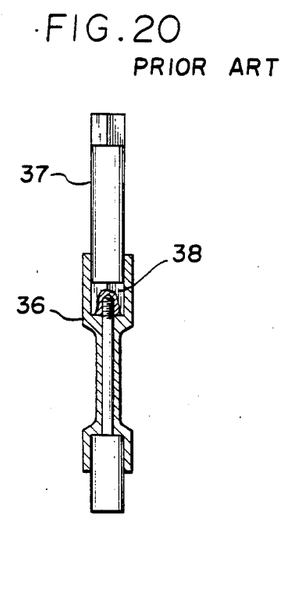
FIG. 20 is a partially cutaway side view of the same combination of the disc with the stem.
Figure 21:
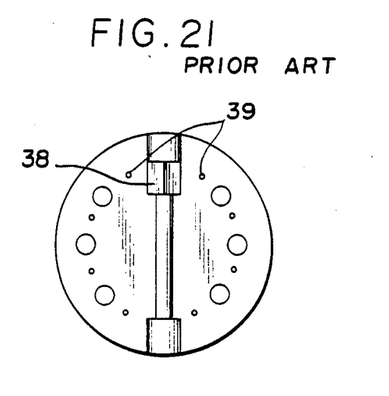
FIG. 21 is a front view of a disc in the conventional butterfly valve mentioned above.

Furthermore in this construction, since the stem 37 is composed of two parts, i.e. one part to be inserted downwardly from above and the other part to be inserted upwardly from below, the valve requires a cover 41 to be disposed beneath the body 40, adding to the complexity of the structure of the body 40 and, at the same time, rendering the disassembly and reassembly of the body 40, when replacement of the disc 36 is required, highly troublesome.

Figure 22:
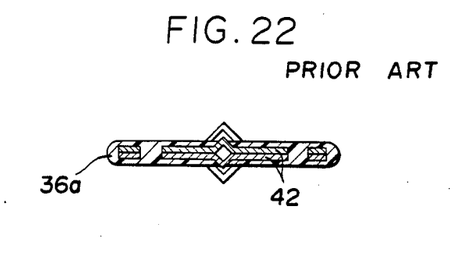
FIG. 22 is a sectional view of a disc coated with rubber in the conventional butterfly valve.
Figure 23:
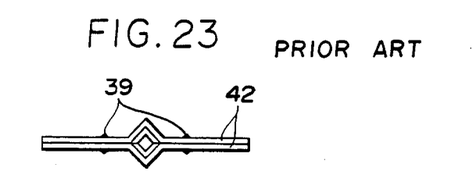
FIG. 23 is a plan view of the same disc before being coated with rubber.

Further, a disc seat 36a in FIG. 22 which is made of rubber, for example, is held fast to the narrow end surfaces defining the peripheral parts of the two metallic plates 42 and are barely connected to the lateral sides of the metallic plates 42 through the medium of thin coating films. Thus, the disc seat 36a has the disadvantage that because of the friction generated between the disc seat 36a and a body seat 40a during an opening or closing motion of the valve, the forced entry of a foreign object between the two seats 36a and 40a, or the suction or vibration generated by the fluid during its passage around the periphery of the disc 36 while the disc 36 is held in a half opened state, the disc seat 36a made of rubber is ripped off of the metal part and is deprived of its sealing property and eventually the corresponding rubber part is torn off.

In addition, in spite of the fact that the disc plates 42 are prevented from corrosion by coating the entire peripheral surfaces thereof with the corrosion proof material as illustrated in FIG. 22, entry of a corrosive fluid into the stem-insertion hole is prevented only by the contact between the opposite ends of the disc 36 and the body seat 40a. This is quite insufficient because a corrosive fluid may possibly enter the stem-insertion hole to corrode the inner wall of the disc 36 defining the stem-insertion hole to thereby fix the stem 37 firmly to the disc 36 and eventually render the disassembly therebetween impossible.

In the constructions disclosed in U.S. Pat. No. 3,902,697 and in Japanese Utility Model Public Disclosure No. SHO 60(1985)-101267, when the valves are to be used in their half opened state or throttled state, namely in a state wherein the speed of passage of fluid near the disc seats 35c, 36a is extremely high, the disc seat 35c in the former valve which is barely nipped between the two metallic plates 35a, 35b and the disc seat 36a in the latter valve which is held fast to the narrow end surfaces defining the peripheral parts of the metallic plates 42 and connected to the lateral sides of the metallic plates 42 through the medium of thin coating films do not efficiently function because they are deficient in robustness and incur the possibility that the seat 36a will be damaged or fractured by the suction or vibration generated by the fluid. Since these valves cannot be effectively used in their half opened state, they do not permit use of a lever handle of the type capable of freely fixing the discs 35 or 36 at any desired position selected for a medium degree of valve opening. The lever handle of this nature, therefore, is disclosed in none of the published materials cited above. When the butterfly valve is opened to a medium degree, the fluid acts so as to move the disc in the direction of closing of the valve. The rotational force exerted on the disc is extremely large such that it possibly alters the degree of valve opening when the flow speed of the fluid is high. For this butterfly valve to be used safely in its half opened state, therefore, it requires the use of a lever handle which is capable of fixing the disc at a position for a medium degree of valve opening.

OBJECT AND SUMMARY OF THE INVENTION

An object of ths invention in to provide a butterfly valve which is capable of comprehensively solving the following problems encountered by the butterfly valve having a disc formed by joining two metallic plates and intended to be used for pipes having relatively small diameters for which gate valves and globe valves of the type described in detail above have been preponderantly adopted to date:

(a) The two metallic plates which make up the disc, when exposed to the fluid in motion, succumb to corrosion.

(b) There is a fair possibility of a corrosive fluid entering the stem-insertion hole of the disc, thereby corroding the inner wall of the disc defining the stem-insertion hole and eventually rendering disassembly between the disc and the stem impossible.

(c) The disc seat is twisted or damaged and is consequently deprived of its sealing property by the friction generated between the disc seat and the body seat during an opening or closing motion of the valve, the forced entry of a foreign object in the gap between the two seats, or the suction or vibration generated by the fluid in motion during its passage around the periphery of the disc while the valve is in a half opened state. The corresponding portion of the rubber part of the disc seat is torn apart.

(d) The valve cannot be disassembled for the purpose of replacement of the disc. Otherwise, the valve's disassembly and reassembly consume much time and labor.

(e) The relative rotational force produced between the stem and the disc deforms the disc and causes the two joined metallic plates of the disc to separate from each other, with the result that the condition of union between the stem and the disc is impaired and the stability of the operating condition of the disc is jeopardized.

(f) The valve cannot be used in its half opened state because the disc is susceptible to breakage under the influence generated consequently.

To accomplish the object described above, this invention provides a butterfly valve which comprises a body having of pipe connecting parts forming two opposite ends thereof and a cylindrical flow path interconnecting the pipe connecting parts, a stem rotatably inserted in the central part of the body diametrically across the cylindrical flow path, a lever handle connected non-rotatably to the external leading end of the stem, a disc composed of two substantially circular metallic plates which are joined in a mutually opposed manner and whose entire outer surfaces are coated with a corrosion-proof resilient material, a stem-insertion hole bored between the two metallic plates in the central diametric position thereof. and disposed inside the cylindrical flow path for accommodating the stem non-rotatably within the stem-insertion hole, whereby the cylindrical flow path is opened or closed by rotating the lever handle, thereby turning a disc from the closed-valve position in which the periphery of the dis is held in tight engagement with an cylindrical flow path to the opened-valve position in which the cylindrical flow path is opened or from the opened-valve position to the closed-valve position, which butterfly valve is characterized by an externally open groove substantially U-shaped in cross section formed in the joint periphery of the two metallic plates, corrosionproof resilient material tightly filling up the externally open groove and conferring a substantially semicircular cross-sectional profile upon the periphery of the disc destined to engage with the cylindrical flow path, the stem-insertion hole comprising one end part having a cylindrical hole bored in a corrosionproof resilient material deposed to cover the interior of an annular part formed with the two metallic plates, an intermediate part having a hole which has a non-circular cross section including at least one pair of parallel sides formed with the metallic plates and continued to the end part, and an opposite end part having a cylindrical hole bored in a corrosionproof resilient material deposited to cover the interior of an annular part formed with the two metallic plates and continued to the intermediate part, the cross-sectional shapes of the holes in the one end part, intermediate part and opposite end part being such that when these cross-sectional shapes have been concentrically superposed, the cross-sectional shape of the cylindrical hole of the opposite end part is able to enter that of the non-circular hole of the intermediate part and that the cross-sectional shape of the non-circular hole of the intermediate part is able to enter that of the cylindrical hole of the one end part, parts of the stem which fall opposite the one end part, intermediate part and opposite end part of the stem-insertion hole having cross-sectional shapes conforming with the cross-sectional shapes of the corresponding parts of the stem-insertion hole, whereby the stem is allowed to be inserted in the stem-insertion hole non-rotatably relative to the disc, the disc being kept in a tight sealing contact with the stem at the one end part and the opposite end part of the stem-insertion hole.

The above and other objects, characteristic features and advantages of the present invention will become more apparent to those skilled in the art as the disclosure is made to the following description of preferred embodiments of the invention, as illustrated in the accompanying drawings:

DETAILED DESCRIPTION OF THE PREFERRED EMBODIMENTS

Now, the present invention will be described in detail below with reference to the illustrated embodiments.

Figure 1:
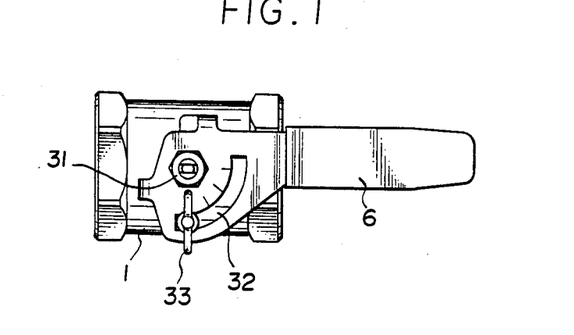
FIG. 1 is a plan view illustrating a typical butterfly valve embodying the present invention.
Figure 2:
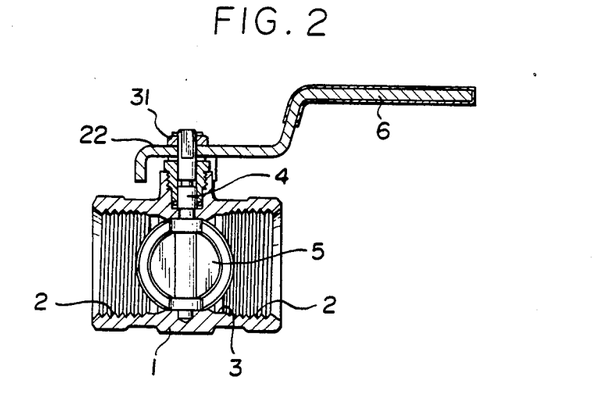
FIG. 2 is a longitudinal section view of the butterfly valve of FIG. 1.
Figure 3:
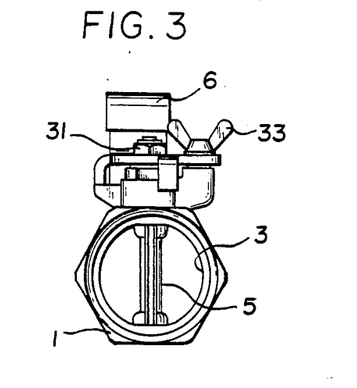
FIG. 3 is a side view of the same butterfly valve.
Figure 4:
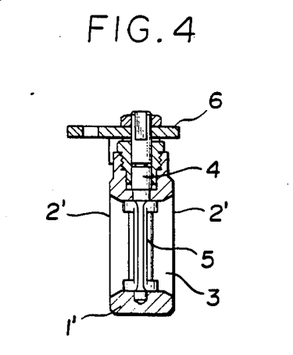
FIG. 4 is a longitudinal section view illustrating another typical butterfly valve embodying the present invention.

FIG. 1 through FIG. 3 are diagrams illustrating one embodiment of this invention in a screw type butterfly valve. In all these diagrams, the butterfly valve is illustrated in its opened state. FIG. 1 is a plan view, FIG. 2 a longitudinal section view, and FIG. 3 a side view. FIG. 4 is a longitudinal section view illustrating another embodiment of this invention in a wafer type butterfly valve in a closed state. The butterfly valve illustrated in FIG. 4 is identical in construction with the butterfly valve illustrated in FIG. 1 through FIG. 3, except for a body 1'.

With reference to FIG. 1 through FIG. 3, a body 1 has pipe connecting parts 2 forming two opposite ends thereof and a cylindrical flow path 3 interconnecting the pipe connecting parts 2. The pipe connecting parts of this body 1 are of a threaded type permitting helical insertion of male threads cut on pipes. A stem 4 is rotatably inserted in the central part of the body 1 diametrically across the cylindrical flow part 3. Reference numeral 5 denotes a disc constructed as fully described below. In FIG. 2 through FIG. 4, this disc 5 is illustrated in outline and not in section. The disc 5, with the stem 4 non-rotatably inserted in the stem-insertion hole thereof, is disposed inside the cylindrical flow path 3 of the body 1. A lever handle 6 is connected non-rotatably to the upper leading end of the stem 4.

In the arrangement described above, the cylindrical flow path 3 of the valve is opened or closed by rotating the lever handle 6 and consequently turning the disc 5 from the closed-valve position in which the periphery of the disc is held in tight engagement with the cylindrical flow path 3 as illustrated in FIG. 4 to the opened-valve position in which the cylindrical flow path is opened as illustrated in FIG. 1 through FIG. 3 or from the opened-valve position to the closed-valve position. With reference to FIG. 4, a body 1' has pipe-connecting parts 2' forming two opposite ends thereof. These pipe-connecting parts 2' constitute themselves a wafer to be nipped between two opposed pipe flanges. The embodiment of FIG. 4 is identical in construction with that of FIG. 1 through FIG. 3, except for the body 1'. The disc 5 to be fully described afterward is also identical in construction.

Figure 5:
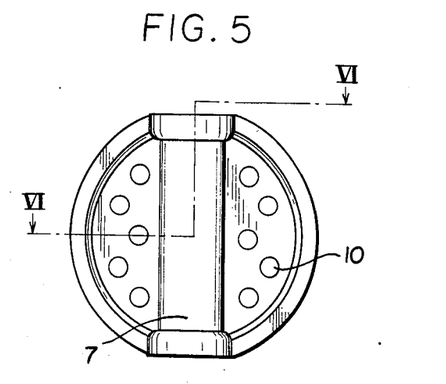
FIG. 5 is a front view illustrating two substantially circular metallic plates joined in a mutually opposed manner to form a disc for use in either of the butterfly valves mentioned above.
Figure 6:
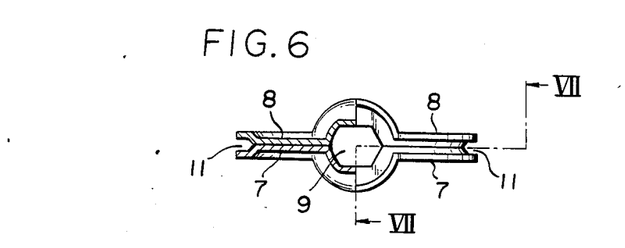
FIG. 6 is a partially cutaway plan view taken along line VI—VI in FIG. 5.
Figure 7:
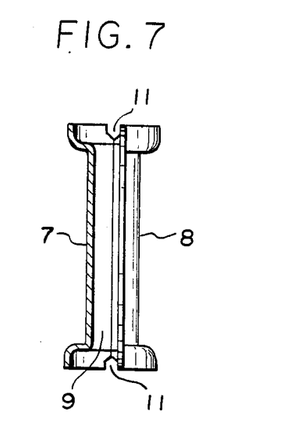
FIG. 7 is a partially cutaway side view taken along lines VII—VII in FIG. 6.

FIG. 5 through FIG. 7 are diagrams invariably illustrating two substantially circular metallic plates joined to each other in a mutually opposed manner which form the disc to be used in the embodiments illustrated in FIG. 1 through FIG. 4. Specifically, FIG. 5 is a front view of the disc, FIG. 6 is a plan view of the cross section taken along the line VI—VI of FIG. 5, and FIG. 7: is a side view of the cross section taken along line VII—VII of FIG. 6.

With reference to FIG. 5 through FIG. 7, reference numerals 7 and 8 denote two substantially circular metallic plates joined fast to each other and numeral 9 denotes a stem-insertion hole which will be described more fully below. Denoted by numeral 10 is a point of electric resistance welding (spot welding) performed for the union of the two metallic plates. A total of ten circles represent such points of welding. The two metallic plates are joined in the present embodiment by the electric resistance welding (spot welding) method. This method is not the only means available for their union. They may be joined by riveting, fastened with a powerful adhesive agent, or soldered by brazing.

The two metallic plates 7, 8 which are joined have an externally open groove 11 of a substantially U-shaped cross section in the joint periphery thereof.

Figure 8:
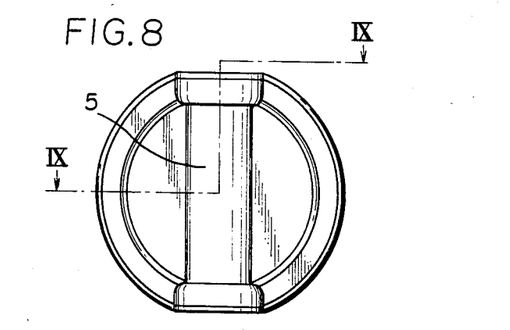
FIG. 8 is a front view of the disc of FIG. 5 coated with a corrosionproof resilient material.
Figure 9:
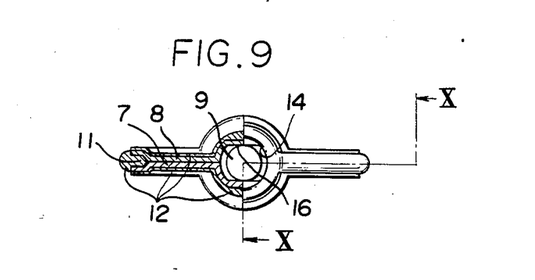
FIG. 9 is a partially cutaway plan view taken along line IX—IX in FIG. 8.
Figure 10:
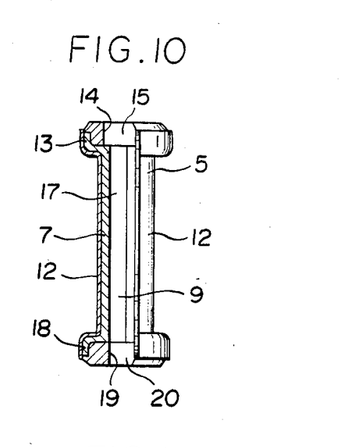
FIG. 10 is a partially cutaway side view taken through along line X—X in FIG. 9.

FIG. 8 through FIG. 10 are diagrams illustrating discs which are formed by coating the entire outer surfaces of the two metallic plates joined as illustrated in FIG. 5 through FIG. 7 with a corrosionproof, resilient material such as rubber. FIG. 8 is a front view, FIG. 9 is a plan view of the cross section taken along line IX—IX of FIG. 8, and FIG. 10 is a side view of the cross section taken along the line X—X of FIG. 9.

With reference to FIG. 8 through FIG. 10, reference numerals 7 and 8 denote two substantially circular metallic plates joined to each other to form a disc 5, numeral 9 denotes a stem-insertion hole, and numeral 12 denotes a corrosionproof, resilient material such as rubber which coats the entire outer surfaces of the two substantially circular metallic plates 7, 8 which are joined in a mutually opposed manner. The externally open groove 11 is filled to capacity tightly with the corrosionproof, resilient material such as rubber. The corrosionproof, resilient material 12 such as rubber which is placed to tightly fill the external open groove 11 has a substantially semicircular cross-sectional outline as illustrated in FIG. 9. The periphery of this filler material comes into watertight engagement with the cylindrical flow path in the completely closed position of the valve as illustrated in FIG. 4.

Owing to the construction described above, the outer surfaces of the two metallic plates 7, 8 have no possibility of being corroded on exposure to the fluid because they are coated with the corrosionproof, resilient material such as rubber. Furthermore, the corrosionproof, resilient material such as rubber which tightly fills the externally open groove 11 in the seat part of the disc 5, namely the joint periphery of the two joined metallic plates 7, 8, is fastened strongly to the metallic plates 7, 8 over a large surface area of the externally open groove 11 and the volume of the corrosionproof, resilient material such as rubber which rests in this groove is amply large. As a result, the deformation caused in the disc when the filler material comes into watertight engagement with the cylindrical flow path 3 of the body or the body seat or when a foreign object is caught between these seats is moderate. The possibility that the disc seat is twisted or fractured and consequently deprived of its sealing property by the friction generated between the disc seat and the body seat during an opening or closing motion of the valve, the forced entry of a foreign object between these two seats, or the suction or vibration caused by the fluid during its passage around the periphery of the disc positioned for a medium degree of valve opening and, further, the corresponding portion of the rubber part of the disc is torn off is precluded.

Figure 11:
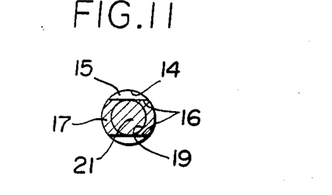
FIG. 11 is an explanatory diagram illustrating, in a concentrically superposed manner, cross-sectional shapes varied at different parts of a stem-insertion hole used in either of the butterfly valves mentioned above.

With reference to FIGS. 9 and 10, the stem-insertion hole 9 of the disc 5 comprises one end part 15 having a cylindrical hole 14 bored in a corrosionproof, resilient material such as rubber deposited to cover the interior of an annular part 13 formed with the two metallic plates 7, 8, an intermediate part 17 having a hole which has a non-circular cross section including at least one pair of parallel sides 16 formed with the two metallic plates 7, 8 and continued to the one end part 15, and an opposite end part 20 having a cylindrical hole 19 bored in a corrosionproof, resilient material such as rubber deposited to cover the interior of an annular part 18 formed with the two metallic plates 7, 8 and continued to the intermediate part 17. The cross-sectional shapes of holes in the one end part 15, the intermediate part 17, and the opposite end part 20 are such that when these cross-sectional shapes are concentrically superposed relative to a point 21 as illustrated in FIG. 11, the cross-sectional shape of the cylindrical hole 19 of the opposite end part 20 is inscribed in the hole in the intermediate part 17 containing one pair of parallel sides 16 and that of the hole of the intermediate part 17 in inscribed in the cylindrical hole 14 of the one end part 15. In FIG. 11, the cross-sectional shape indicated by hatch lines is that of the hole of the intermediate part 17.

Figure 12:
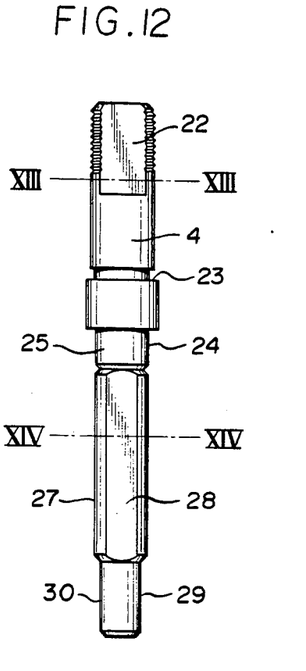
FIG. 12 is a front view of a stem for use in either of the butterfly valves mentioned above.
Figure 13:
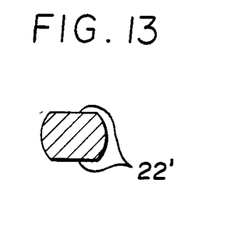
FIG. 13 is a sectional view taken along line XIII—XIII in FIG. 12.
Figure 14:
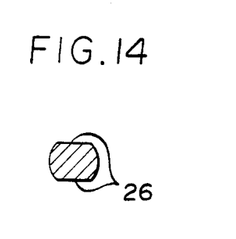
FIG. 14 is a sectional view taken along line XIV—XIV in FIG. 12.
Figure 15:
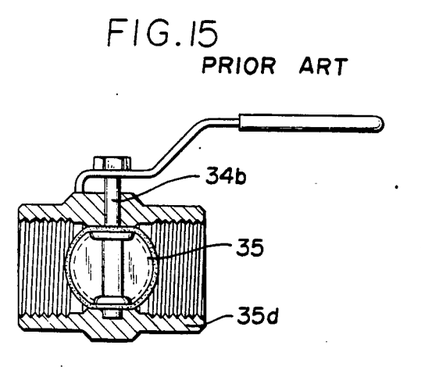
FIG. 15 is a sectional view illustrating a conventional butterfly valve.
Figure 16:
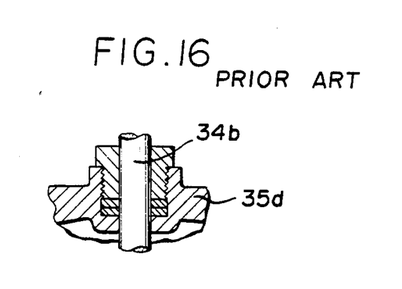
FIG. 16 is a partially magnified sectional view of the conventional butterfly valve mentioned above.
Figure 17:
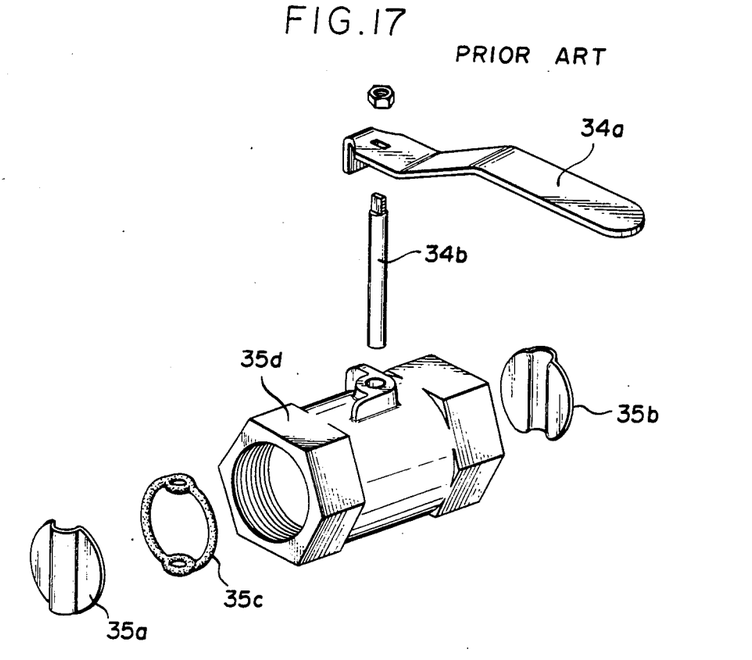
FIG. 17 is an exploded perspective view of the same conventional butterfly valve.

The stem 4 is inserted in the disc 5 as illustrated in FIG. 2 and FIG. 4. The former is inserted in and connected to the latter non-rotatably. FIG. 12 is a front view illustrating the stem 4 to be inserted in the discs illustrated in FIG. 8 through FIG. 10 of the embodiments of FIG. 1 and FIG. 4. FIG. 13 and FIG. 14 are sectional views taken along the line XIII—XIII and the line XIV—XIV in FIG. 12 respectively.

The stem 4 is provided at the outer leading end thereof with two parallel surfaces 22 (parallel sides 22' as viewed in section) adapted for the lever handle 6 to be non-rotatably connected thereto (FIG. 2). A stepped portion 23 is formed (FIG. 2, FIG. 4) for the purpose of preventing the stem 4 from being pulled out upwardly from the body 1 or 1'. A central circular sectioned part 25 of the stem is an upper cylindrical part 24 having an outside diameter matched to the cylindrical hole 14 formed in the one end part 15 of the stem-insertion hole 9 of the disc 5. The upper portion of the upper cylindrical part 24 is inserted in the hole of the body 1 (FIG. 2) and the lower portion thereof is inserted in the cylindrical hole 14 formed in the one end part 15 of the stem-insertion hole 9 of the disc 5. A non-circular sectioned part 27 of the stem 4 has a cross-sectional shape matched to the cross-sectional shape of the intermediate part 17 of the stem-insertion hole 9 of the disc 5. The cross-sectional shape of the non-circular sectioned part 27 includes two parallel surfaces 28 matched to the parallel sides 16 of the cross-sectional shape of the intermediate part 17 of the stem-insertion hole 9 of the disc and the parallel sides 26 in the cross section of FIG. 14. It is provided, however, that the cross-sectional shape of the non-circular sectioned part 27 of the stem 4, except for the pair of parallel sides 26, is only required to be such that it could enter the hole of non-circular section in the intermediate part 17 of the stem-insertion hole 9 of the disc 4. A circular sectioned part 30 at the lower end is a lower cylindrical part 29 having an outside diameter matched to the cylindrical hole 19 formed in the opposite end part 20 of the stem-insertion hole 9 of the disc 5. The upper portion of the lower cylindrical part 29 is inserted in the cylindrical hole 19 formed in the opposite end part of the stem-insertion hole 9 of the disc 5 and the lower portion thereof is inserted in the hole of the body 1 or 1' (FIG. 2 or FIG. 4). Due to this arrangement, when the stem 4 is inserted in the stem-insertion hole 9 of the disc 5, the cylindrical hole 14 in the one end part 15 of the stem-insertion hole 9 of the disc 5 admits the upper cylindrical part 24 of the stem 4, the intermediate part 17 thereof admits the non-circular sectioned part 27 of the stem 4, and the cylindrical hole 19 of the opposite end part 20 admits the lower cylindrical part 29 respectively. The stem is consequently set non-rotatably in the disc 5 because of the combination of the parallel surfaces of the intermediate part 17 of the stem-insertion hole 9 of the disc 5 and the parallel surfaces 28 of the non-circular sectioned part of the stem 4. Due to the construction described above, the relative rotational force produced between the disc 5 and the stem 4 is born by a relatively long portion of the intermediate part 17 (the intermediate part 17 of the stem-insertion hole of the disc and the non-circular sectioned part 27 of the stem). On the other hand, the force which arises from the flow or pressure of the fluid in motion, the friction generated between the disc seat and the body seat, or the forced entry of a foreign object between the two seats and which tends to rotate the disc or prevent the disc from the rotation has the center of action thereof resting at the central part of the disc on the aforementioned relatively long portion of the intermediate part serving to bind the disc 5 and the stem 4 non-rotatably. As a result, any force tending to twist the disc and deform it is not produced. The greater part of the points 10 of electric resistance welding (spot welding) or equivalent rivets serving to join the two metallic plates 7, 8 are located near the relatively long intermediate part 17 of the stem-insertion hole 9 of the disc 5 with which the stem 4 is non-rotatably joined (FIG. 5), so that the relative rotational force produced between the stem 4 and the disc 5 is safely supported by these points or rivets. Even when the two metallic parts are fastened with powerful adhesive agent or soldered by brazing, since the wide contact surfaces adjoining the long intermediate part are utilized for the union, the possibility that the two joined metallic plates 7, 8 are separated from each other in inhibited, the condition of union between the stem 4 and the disc 5 is not impaired, and the stability of the opened or closed state of the valve is not jeopardized.

Further, since the disc 5 is kept in a tight sealing contact with the stem 4 at the one end part 15 and the opposite end part 20, there is no problem of a fluid entering the stem-insertion hole 9 and, therefore, the inner walls of the metallic plates 7 and 8 defining the intermediate part 17 of the stem-insertion hole 9 are not corroded, thereby making it possible to prevent a firm attachment between the disc 5 and the stem 4 so as not to be able to disassemble them.

With reference to FIG. 1 through FIG. 3, the lever handle 6 is non-rotatably fixed by causing the hole of the lever handle 6 containing two parallel surfaces to be inserted around the outer leading end of the stem 4 containing two parallel surfaces 22 and then tightening the lever handle 6 with a nut 31. The lever handle 6 is a stationary structure capable of being fixed in place at any desired position between the opened-valve position and the closed-valve position. In the embodiment illustrated in FIG. 1 through FIG. 3, the lever handle 6 is provided with an arcuate groove 32. A wing bolt 33 is passed through this groove 32 and is helically driven into a threaded hole formed in the body 1 or 1'. The non-rotatable fixation of the lever handle 6 is obtained by tightening this wing bolt 33. As a result, the butterfly valve, the disc 5 of which would otherwise be moved in the valve-opening direction, can be fixed at any desired position between the opened-valve position and the closed-valve position so that the valve can be used with a medium degree of valve opening. Furthermore, since the disc 5 and the stem 4 are bound strongly and since the corrosion-proof, resilient material of the seat part of the disc is attached fast to the two metallic plates 7, 8 of the disc 5 as described above, the disc 5 cannot sustain any fracture even when it is held at a position for a medium degree of valve opening. Thus, the butterfly valve of this invention is suitable for use in a half opened state.

Needless to say, the fixing structure for the lever handle is not limited to that described in the embodiment above.

The disc of the butterfly valve of this invention can not be corroded by the fluid in motion because it is formed by joining two substantially circular metallic plates in a mutually opposed manner and coating the entire outer surfaces of the metallic plates with the corrosionproof, resilient material such as rubber as described above.

Furthermore, the disc is provided between the two metallic plates in the central diametric position thereof with an insertion hole for non-rotatably admitting the stem therein, the stem is inserted non-rotatably in the disc but rotatably in the body in the central part of the body diametrically across the cylindrical flow path of the body, and the cross-sectional shapes of the various parts of the stem inserted in the disc are smaller in size on the stem. Thus, by upward extraction of the stem from the disc, the disc can be taken out of the body for the purpose of replacement.

Moreover, the two metallic plates joined to form the disc have the externally open groove of a substantially U-shaped cross section in the joint periphery thereof, this open groove is filled to capacity tightly with the corrosionproof, resilient material such as rubber which coats the entire outer surface of the disc, and the periphery of the corrosionproof, resilient material such as rubber filling the open groove and destined to come into tight engagement with the flow path of the body, namely the disc seat part, has a substantially semi-circular cross-sectional outline. As a result, the corrosion-proof, resilient material such as rubber forming the disc seat is attached fast to the two metallic plates over a wide surface area and, at the same time, the volume of the corrosionproof, resilient material such as rubber used in this part is amply large. The deformation caused in the disc seat part when the filler material comes into watertight engagement with the flow path of the body or the body seat is not immoderate. The possibility that the disc is twisted, fractured, and consequently deprived of its sealing property by the friction generated between the disc seat and the body seat during an opening or closing motion of the valve, the forced entry of a foreign object between the two seats, or the suction or vibration generated by the fluid in motion during the passage thereof around the periphery of the disc while the valve is held in a medium degree of valve opening and the corresponding portion of the rubber part of the disc is torn apart is precluded.

The stem-insertion hole which is formed between the two metallic plates for the purpose of admitting the stem at the central diametric position of the disc comprises the three parts, i.e. one end part, intermediate part and opposite end part. The one end part and the opposite end part which constitute the opposite extremities have circular cross sections. The intermediate part has a non-circular cross section containing at least one pair of parallel sides. The cross-sectional shape of the opposite end part can be inscribed in that of the intermediate part, which can be inscribed in that of the one end part. In other words, these cross-sectional shapes gradually decrease in their descending order. In the case of the stem, the parts of the stem which fall opposite the different parts of the stem-insertion hole of the disc when the stem is inserted home in the stem-insertion hole of the disc have cross-sectional shapes conforming to the cross-sectional shapes of the corresponding parts of the disc. As a result, the disc is kept concentrically with the stem at the opposite extremities, i.e. the one end part and the opposite end part, and it is non-rotatably attached to the stem by at least one pair of parallel surfaces (two sides in section) in the intermediate part. In other words, the relative rotational force produced between the disc and the stem is borne by the relatively long portion of the intermediate part. On the other hand, the center of action of the force which arises from the flow or pressure of the fluid in motion, the friction generated between the disc seat and the body seat, or the forced entry of a foreign object between the two seats and which tends to rotate the disc or prevent the disc from the rotation rests at the central part of the disc on the intermediate part which non-rotatably binds the disc and the stem. Thus, no force is generated which twists the disc and deforms it. Furthermore, many of the points of electric resistance welding (spot welding) or equivalent rivets serving to bind the two metallic plates are located near the intermediate part of the stem-insertion hole and these many points of electric resistance welding (spot welding) or rivets can bear the relative rotational force produced between the stem and the disc. Even when the two metallic plates are fastened with powerful adhesive agent or soldered by brazing, they are joined over wide contact areas adjoining the long intermediate part. Thus, the possibility that the two joined metallic plates become separated from each other is inhibited, the condition of union between the stem and the disc being consequently impaired is prevented, and the stability of the opening and closing condition from being jeopardized is precluded.

Furthermore, since the disc is kept in a tight sealing contact with the stem at the one end part and the opposite end part, there is no problem of a fluid entering the stem-insertion hole and, therefore, the inner walls of the metallic plates defining the intermediate part of the stem-insertion hole are not corroded, thereby making it possible to prevent a firm attachment between the disc and the stem.

Moreover, the disc can be used safely even in a position corresponding to a medium degree of valve opening because the stem and the disc are bound to each other through the medium of the long intermediate part and the condition of this union is strong and because the disc seat is disposed so as to tightly fill the external open groove having a U-shaped cross section dug in the joint periphery of the two metallic plates, is attached fast to the two metallic plates over a wide surface area and, therefore, is highly tenacious. Besides, the fluid in motion is not allowed to turn the disc and alter the degree of valve opening because the lever handle has a fixing structure permitting itself to be fixed non-rotatably at any desired position between the opened-valve position and the closed-valve position. Thus, the butterfly valve of this invention is suitable for use in a half opened state.

Owing to the novel and efficient construction described above, the butterfly valve of this invention brings about the following effects.

(1) The two metallic plates forming the disc are not corroded by the fluid in motion to which they are exposed.

(2) Entry of a corrosive fluid into the stem-insertion hole of the disc, corrosion of the inner walls of the disc defining the stem-insertion hole, and firm attachment between the stem and the disc so as not be able to disassemble them can be fully be eliminated.

(3) The disc is not twisted or broken and consequently deprived of its sealing property, the corresponding portion of the rubber part thereof is not torn off by the friction generated between the disc seat and the body seat during an opening or closing motion of the valve, the forced entry of a foreign object between the two seats mentioned above, or the suction or vibration generated by the fluid in motion during its passage around the periphery of the disc held in a position for a medium degree of valve opening.

(4) The valve can be disassembled for the purpose of replacement of the disc. It can be disassembled and reassembled with great ease.

(5) The relative rotational force produced between the stem and the disc does not deform the disc, cause separation of the two joined metallic plates of the disc, impair the condition of union between the stem and the disc, or jeopardize the stability of the opened or closed condition of the valve.

(6) The butterfly valve can be used in its half opened state.

What is claimed is:

1. A butterfly valve comprising:
a body having a cylindrical central portion and pipe connecting means at opposite ends thereof for connecting said body to a pipe at each of said opposite ends;
a disc rotatably mounted in said cylindrical portion for rotating between a first position in which said disc is perpendicular to the central longitudinal axis of said cylindrical central portion and said valve is closed and a second position in which said disc extends in a plane that is parallel to said central longitudinal axis, said disc comprising
two substantially circular metallic plates fastened together opposite one another in a mutually opposed manner, said metallic plates each having a coat of corrosion proof material on the entire surface thereof that faces away from the other, said two fastened metallic plates having a circular recess at the top and bottom thereof and a central bore having a non-circular cross-section extending between and open to said top and bottom circular recesses, a groove having a substantially U-shaped cross-section extending around the periphery thereof whereat said metallic plates adjoin between said top and bottom circular recesses, and corrosion-proof resilient material between said coated surfaces of said metallic plates substantially in said U-shaped groove, said top recess and said bottom recess for providing an annular seal between said metallic plates and said cylindrical central portion when said disc is rotated to said first position, said corrosion-proof material having a top cylindrical hole extending therethrough open to and concentric with said central bore at said top recess and a bottom cylindrical hole extending therethrough open to and concentric with said central bore at said bottom recess, said cross-section of said cylindrical bore being inscribable within the circular cross-section of said circular top cylindrical hole, the circular cross-section of said bottom cylindrical hole being inscribable within said cross-section of said central bore;

a stem rotatably monted to said cylindrical central portion and extending through said disc, said stem having a first portion having a circular cross-section approximately the same size as that of said top cylindrical hole and extending therethrough, a second portion having a non-circular cross-section approximately the same in size and shape as that of said central bore and extending therethrough, and a third portion having a circular cross-section approximately the same size as that of said bottom cylindrical hole whereby said stem is removable from said disc through the top thereof; and a lever handle outside of said cylindrical central portion attached to said stem for rotating said disc between said first and second positions via said stem.

2. A butterfly valve as claimed in claim 1 and further comprising, fixing means attached to said lever handle for fixing said disc relative to said central cylindrical portion in any desired position between said first and second positions.

* * * * *